(12) United States Patent
Yellapragada

(10) Patent No.: US 10,044,806 B2
(45) Date of Patent: Aug. 7, 2018

(54) SYSTEM AND METHOD FOR MANAGING VIRTUAL HARD DISKS IN CLOUD ENVIRONMENTS

(71) Applicant: CA, Inc., Islandia, NY (US)

(72) Inventor: Subrahmanya Sarma Yellapragada, Hyderabad (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 15/449,299

(22) Filed: Mar. 3, 2017

(65) Prior Publication Data

US 2017/0180479 A1    Jun. 22, 2017

Related U.S. Application Data

(63) Continuation of application No. 13/402,197, filed on Feb. 22, 2012, now abandoned.

(51) Int. Cl.
| | |
|---|---|
| *G06F 15/173* | (2006.01) |
| *H04L 29/08* | (2006.01) |
| *G06F 3/06* | (2006.01) |
| *G06F 17/30* | (2006.01) |
| *G06F 9/50* | (2006.01) |

(52) U.S. Cl.
CPC ......... *H04L 67/1097* (2013.01); *G06F 3/064* (2013.01); *G06F 3/0605* (2013.01); *G06F 3/067* (2013.01); *G06F 3/0631* (2013.01); *G06F 3/0643* (2013.01); *G06F 3/0664* (2013.01); *G06F 3/0665* (2013.01); *G06F 9/5077* (2013.01); *G06F 17/30233* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,788,628 B1 * | 7/2014 | Taylor | G06F 17/30132 709/219 |
| 2010/0333116 A1 * | 12/2010 | Prahlad | G06F 17/30082 719/328 |
| 2011/0022566 A1 * | 1/2011 | Beaverson | G06F 17/30097 707/639 |
| 2011/0083167 A1 * | 4/2011 | Carpenter | G06F 17/30563 726/4 |

(Continued)

*Primary Examiner* — Phyllis A Book
(74) *Attorney, Agent, or Firm* — Pillsbury Winthrop Shaw Pittman LLP

(57) ABSTRACT

A system, method, and computer-readable storage medium for managing virtual hard disks in a cloud computing/storage environment are provided. The method includes associating, using a virtual hard disk (VHD) management system of a server device, a plurality of data blocks of a virtual hard disk stored at a cloud vendor to a corresponding plurality of cloud objects. A plurality of cloud object identifiers associated with the plurality of cloud objects in a first cloud allocation table are stored. Changes to one or more data blocks are determined. Corresponding new cloud allocation tables for every data block in the plurality of data blocks that has changed are formed, the new cloud allocation tables having corresponding new cloud object identifiers. The first and the new cloud allocation tables are downloaded and merged to form an updated cloud allocation table. The updated cloud allocation table is uploaded to the cloud vendor.

20 Claims, 7 Drawing Sheets

(56) References Cited

U.S. PATENT DOCUMENTS

| | | | | |
|---|---|---|---|---|
| 2011/0295851 A1* | 12/2011 | El-Saban | ............ | G06F 17/3082 |
| | | | | 707/728 |
| 2012/0124285 A1* | 5/2012 | Soran | .................... | G06F 3/0608 |
| | | | | 711/114 |
| 2012/0324446 A1* | 12/2012 | Fries | ........................ | G06F 21/64 |
| | | | | 718/1 |
| 2013/0204991 A1* | 8/2013 | Skjolsvold | ............ | G06F 9/5083 |
| | | | | 709/223 |

\* cited by examiner

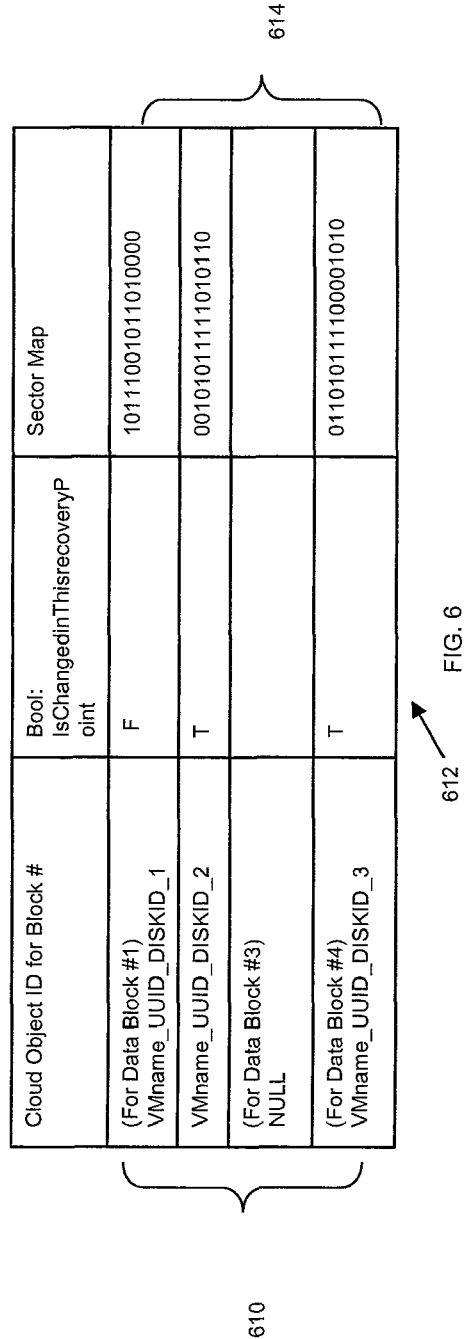

CAT FOR BASE VHD

| Cloud Object ID for Data Block | Bool: IsChangedinThisrecoveryPoint |
|---|---|
| ObjectID #1 | T |
| ObjectID #2 | T |
| ObjectID #3 | T |
| NULL | - |

FIG. 10A

CAT FOR CHILD VHD

| Cloud Object ID for Data Block | Bool: IsChangedinThisrecoveryPoint |
|---|---|
| ObjectID #4 | T |
| ObjectID #2 | F |
| ObjectID #3 | F |
| NULL | - |

FIG. 10B

UPDATED CAT AFTER MERGE OPERATION

| Cloud Object ID for Block # | Bool: IsChangedinThisrecoveryPoint |
|---|---|
| ObjectID #4 | T |
| ObjectID #2 | T |
| ObjectID #3 | T |
| NULL | - |

FIG. 10C

SYSTEM AND METHOD FOR MANAGING VIRTUAL HARD DISKS IN CLOUD ENVIRONMENTS

CROSS-REFERENCE TO RELATED APPLICATIONS

The present patent is a continuation of U.S. patent application Ser. No. 13/402,197, filed 22 Feb. 2012, having the same title, the entire content of which is hereby incorporated by reference.

FIELD

The invention relates generally to the field of cloud computing/storage systems and more particularly to efficiently and cost effectively managing virtual hard disks in cloud environments.

BACKGROUND

Cloud computing/storage environments have turned around the manner in which business organizations examine the requirements and capacity to implement their data processing needs. A cloud computing/storage environment includes capabilities where the cloud provider hosts the hardware and related items and provides systems and computational power as a service to a customer (e.g., a business organization). When implementing data processing needs via a cloud vendor, a customer does not need to bear the cost of space, energy, and maintenance in order to acquire the required computational resources at a reasonable cost, and can back up data to a cloud vendor's storage facility or device.

Cloud computing/storage environments support virtual machines (VM) that may be defined as emulation of physical machines in software, hardware, or combination of both. A set of services or resources may form a virtual machine image that has associated recovery points or snapshots. A recovery point or snapshot of a virtual machine (VM) is a point in time copy of the virtual machine. In a typical scenario, recovery points or snapshots of a virtual machine can be copied and stored in a cloud computing and storage environment. Recovery points are created at regular intervals and data is stored at the recovery points containing one or more virtual hard disks (VHDs) used as hard disks for the virtual machine and stored as files in the cloud computing/storage environment. Conventionally, to merge or consolidate these recovery points or snapshots, for example, when two or more different recovery points are to be merged, virtual VHDs of the virtual machine associated with the recovery points, are downloaded from the cloud environment and then merged locally. The merged VHDs are then again uploaded into the cloud environment. Unfortunately, such downloading and uploading of snapshots in the form of VHDs is expensive and time consuming. These and other drawbacks exist.

SUMMARY

In some implementations, these and other drawbacks of existing systems are addressed, where provided is a system, method, and computer-readable storage medium having one or more computer-readable instructions thereon for managing virtual hard disks in a cloud computing/storage environment. The method includes associating, using a virtual hard disk (VHD) management system of a server device, a plurality of data blocks of a virtual hard disk stored at a cloud vendor to a corresponding plurality of cloud objects. A plurality of cloud object identifiers associated with the plurality of cloud objects in a first cloud allocation table are stored. Changes to one or more data blocks in the plurality of data blocks are determined. Corresponding new cloud allocation tables for every data block in the plurality of data blocks that has changed are formed, the new cloud allocation tables having corresponding new cloud object identifiers. The first and the new cloud allocation tables are downloaded. The first and the new cloud allocation tables are merged to form an updated cloud allocation table. The updated cloud allocation table is uploaded to the cloud vendor such that the updated cloud allocation table includes information regarding the changed data blocks in the plurality of data blocks.

Various other objects, features, and advantages of the invention will be apparent through the detailed description and the drawings attached hereto. It is also to be understood that both the foregoing general description and the following detailed description are exemplary and not restrictive of the scope of the invention.

BRIEF DESCRIPTION OF THE DRAWINGS

FIG. 5 is an illustration of a disk information field of the dynamic VHD, according to various implementations of the invention.

FIG. 6 is an illustration of a structure of cloud allocation table, according to various implementations of the invention.

FIGS. 10A and 10B illustrate examples of cloud allocation tables of base virtual hard disk and child virtual hard disk, according to various implementations of the invention.

FIG. 10C illustrates an example of a cloud allocation table of a consolidated base disk after a merge operation, according to various implementations of the invention.

DETAILED DESCRIPTION OF THE INVENTION

Figure 1:
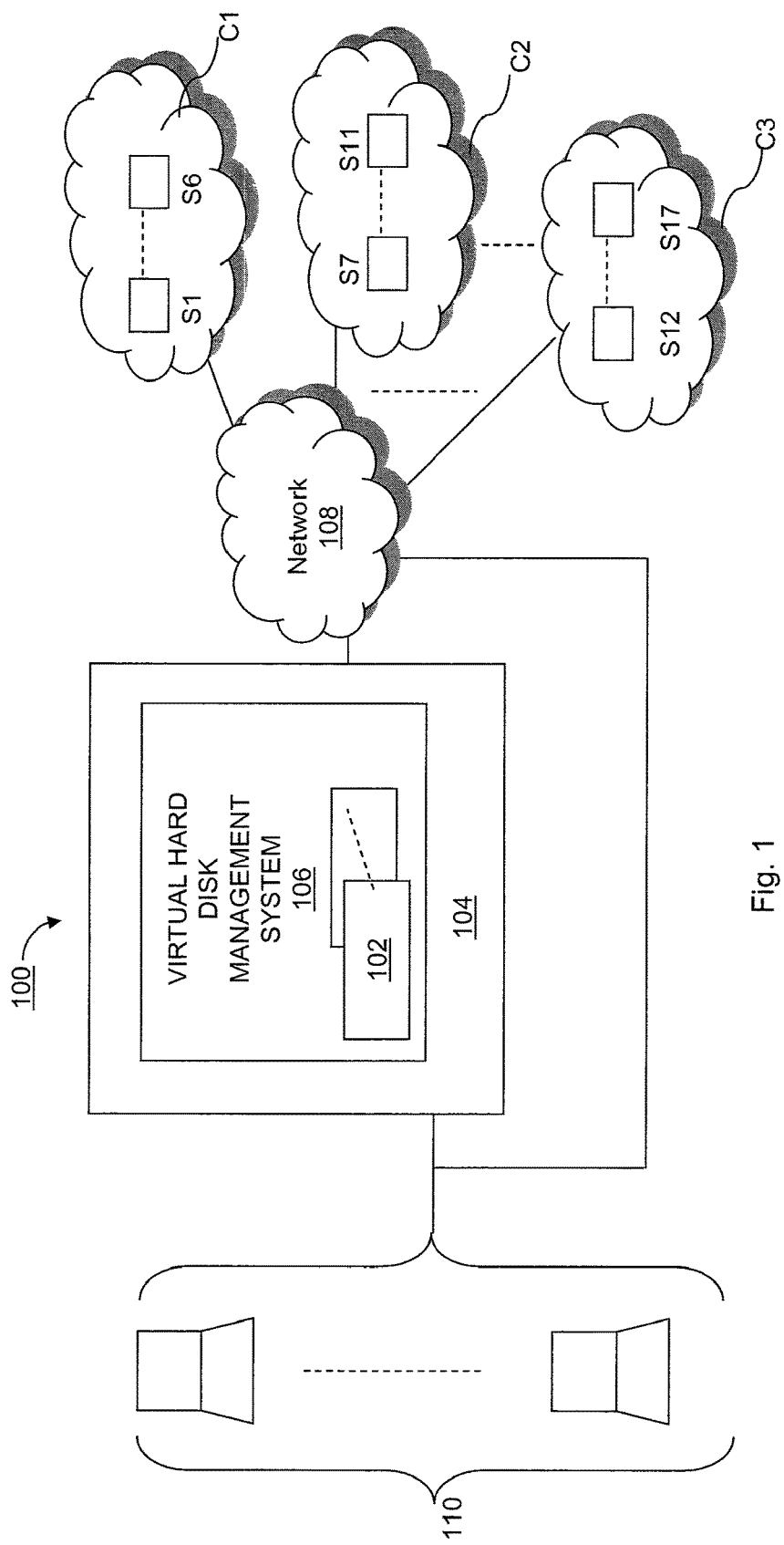
FIG. 1 is an illustration of an example environment for managing virtual hard disks in a cloud computing/storage environment, according to various implementations of the invention.

It is to be noted that the following definitions are included solely for illustration purposes, and these definitions are indicative with respect to the implementations described herein and are not meant to be exhaustive or restrictive in nature.

In some implementations, a virtual machine (VM) is defined as an emulation or implementation of an actual machine, e.g., a computer. In some implementations, the VM may be software that simulates the computer or any other machine.

In some implementations, a VM has an image that is a snapshot of a resource or service provided in a cloud computing/storage environment and managed. A virtual machine image may include one or more VHDs.

In some implementations of this invention, a VHD is defined as a file format that may contain what is found on a physical hard disk drive, such as disk partitions and a file system, which in turn can contain files and folders. A VHD is typically used as the hard disk of a virtual machine.

In some implementations, a cloud object defines a basic unit of storage in a cloud computing/storage environment.

In some implementations, a recovery point or a snapshot is defined as point-in-time copy of the VM that may include a point-in-time state of the VM.

In some implementations, an image is defined as a Virtual Machine image that is a collection of resources or services available for use by a customer in a cloud computing/storage environment.

In some implementations, a block allocation table is defined as a table of absolute sector offsets into a file backing a hard disk of a computer system.

In some implementations, a data block is defined as a sequence of bytes or bits.

In some implementations, a cloud object identifier is defined as a variable or field that identifies a cloud object. For example, a blob name for AZURE® provided by Microsoft Corporation of Redmond, Wash. and object name for S3® provided by Amazon.com, Inc. of Seattle, Wash. are cloud object identifiers.

In some implementations, at a given time, a dynamic disk may be as large as the actual data written to it plus the size of the header and footer. Allocation of data may be done in blocks such that as more data is written, a file associated with the dynamic disk dynamically increases in size by allocating more blocks. In the context of a VHD, at a given time, a dynamic disk may be as large as the actual data written to it plus the size of the header and footer. Allocation of data may be done in blocks such that as more data is written, a file associated with the dynamic disk dynamically increases in size by allocating more blocks.

In some implementations, a differencing disk is defined as a virtual hard disk used to isolate changes to the VHD or a guest operating system by storing them in a separate file.

In some implementations, a sector map for dynamic disks is defined as a bitmap that indicates which sectors contain valid data (indicated by binary 1's) and which sectors have never been modified (indicated by binary 0's). For differencing disks, the sector bitmap indicates which sectors are located within the differencing disk (indicated by binary 1's) and which sectors are in the parent (indicated by binary 0's).

FIG. 1 is an exemplary illustration of an environment 100, which is an example of an environment having a system for managing virtual hard disks in a cloud computing/storage environment. In some implementations, environment 100 includes, among other things, a server device 104 (interchangeably referred to herein as server 104), one or more client devices 110, one or more cloud storage service providers C1-Cn (interchangeably referred to herein as cloud vendors C1-Cn), and a network 108 for communication between various components of environment 100 via wired, wireless, optical, or other types of communication links, known to one of ordinary skill in the art.

In some implementations, server device 104 may include a hardware computing device having an operating system, disk drives, interfaces/ports, memory, buses, cooling subsystems, and various software stored therein on tangible computer readable media. Specifically, in some implementations, server device 104 may include a virtual hard disk (VHD) management system 106, as described below, for managing virtual hard disks stored at various cloud vendors C1-Cn in a cloud computing/storage environment, such as environment 100. In some implementations, server device 104, although shown separate from cloud vendors C1-Cn in environment 100, may be a part of one of cloud vendors C1-Cn. In some implementations, server device 104 may be a server supporting a plurality of jobs/applications for one or more client devices 110. In some implementations, server device 104 includes electronic and electrical circuitry such as processors and memory and/or other hardware operable to execute computer-readable instructions using, for example, an operating system (OS). In some implementations, server device 104 may include a security device that monitors various security aspects for an organization in environment 100. In some implementations, server device 104 may include one or more tangible computer-readable storage media configured to store one or more software modules, wherein the software modules include computer-readable instructions that when executed by one or more processors in server device 104 may cause the processors to perform the functions related to managing virtual hard disks in a cloud computing/storage environment, as described herein. In some implementations, server device 104 may comprise computer hardware programmed with a computer application having one or more software modules that enable the various features and functions related to managing virtual hard disks in a cloud computing/storage environment (e.g., environment 100), as described herein. It will be appreciated that in some implementations server device 104 may be located remote from a physical location of the organization (e.g., on a home computer of a user within the organization's network), and various implementations of the present invention are not limited by the location of server device 104. Further, although one server device 104 is shown, in some implementations, cloud vendors C1-Cn and/or client devices 110 may communicate in parallel or in series with a plurality of different types of server devices including but not limited to mobile and desktop client computing/storage devices.

In some implementations, VHD management system 106 may be implemented, for example, using one or more programming languages such as C, Java, or other programming languages known to one of ordinary skill in the art. In some implementations, VHD management system 106 forms a system with electronic files stored in one or more memory devices of server 104 to manage snapshots of images executing at server 104. In some implementations, VHD management system 106 includes code or instructions stored on computer readable medium or computer readable storage device, which when executed by a processor cause the processor to implement various features and functionalities including managing, storing, retrieving, and merging VHDs in cloud storage devices provided, e.g., by cloud vendors C1-Cn. In some implementations, VHD management system 106 is part of one or more memory devices in server device 104. In some implementations, VHD management system 106 is a hardware module implemented in server device 104 as an Application Specific Integrated Chip (ASIC) with various logic circuitry integrated thereupon to implement the functionalities of VHD management system 106 discussed in FIGS. 3-10. In some implementations, VHD management system 106 is implemented using a Field Programmable Gate Array (FPGA) device. It will be appreciated that implementations of VHD management system 106 may be carried out using a combination of hardware and software, as can be contemplated by one of ordinary skill in the art in view of this disclosure. In some implementations, VHD management system 106 includes one or more cloud allocation tables (CATs) 102 (also referred to as CAT tables 102), discussed with respect to FIGS. 3-10.

In some implementations, client devices 110 interact, directly or indirectly through server device 104, with a plurality of cloud storage service providers C1-Cn via wired, wireless, optical, or other types of communication links over network 108 known to one of ordinary skill in the art. Client devices 110 are computing devices known to those of ordinary skill in the art (e.g., mobile or desktop computing devices). In some implementations, one or more client devices 110 may access resources provided by cloud vendors C1-Cn through server device 104.

In some implementations, network 108 may be the Internet or the World Wide Web ("www"). In some implementations, network 108 may be a switching fabric that is part of a Wide Area Network (WAN), a Local Area Network (LAN), or other types of networks known to those of ordinary skill in the art (e.g., a TCP/IP network). In some implementations, network 108 routes requests from server 104 and/or client devices 110 for accessing various resources.

In some implementations, a plurality of cloud vendors C1-Cn may include storage devices and hardware that may be part of or separate from one or more servers (e.g., servers S1-S6 in cloud vendor C1, servers S7-S10 in cloud vendor C2, and servers S12-S17 in cloud vendor Cn). The storage devices and hardware may store data on respective memory devices therein. The servers may be accessed by server device 104 for providing applications/services to customers at client devices 110, although other servers or devices may access servers S1-S17 for other purposes. Further, any number of servers communicably connected in known ways may be used as appropriate for cloud vendors C1-Cn and the number and types of connections shown for the servers S1-S17 in FIG. 1 is by way of example only and not by way of limitation. An example of cloud vendors C1-Cn includes cloud computing/storage services provided by Amazon.com, Inc. of Seattle, Wash., although other vendors may be used.

Figure 2:
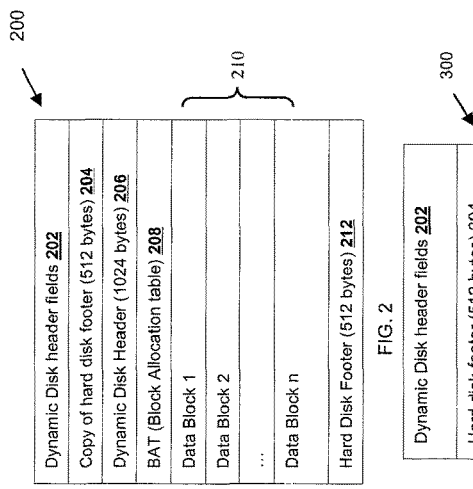
FIG. 2 is an illustration of a conventional format for a dynamic virtual hard disk.

FIG. 2 illustrates a basic format of a dynamic virtual hard disk stored in the cloud storage environment, for example, in environment 100 at one of cloud vendors C1-Cn. In some implementations, for example in dynamic disk images, the VHD file format is represented as a file 200 that includes one or more dynamic disk header fields 202 including a copy of hard disk footer 204, a dynamic disk header 206, a block allocation table (BAT) 208, and one or more data blocks 210. For example, some virtual hard disk formats are supported by Microsoft Virtual PC® and Virtual Server® provided by Microsoft Corporation of Redmond, Wash. include fixed hard disk image, dynamic hard disk image, and differencing hard disk image formats, although other formats provided by other vendors may be used, as will be apparent to one of ordinary skill in the art. It is to be noted that sizes of various fields of file 200 are exemplary in nature, and are not intended to be limiting, as will be appreciated by one of ordinary skill in the art. In some implementations, virtual hard disks of respective virtual machines are not stored as a single cloud unit storage object.

Conventionally, BAT 208 is a table of absolute sector offsets into file 200 backing a virtual hard disk. BAT 208 is pointed to by a "Table Offset" field (not shown) of dynamic disk header 206. The size of BAT 208 is calculated during creation of the virtual hard disk. The number of entries in BAT 208 is the number of data blocks 210 needed to store the contents of the virtual hard disk when fully expanded. For example, in some implementations, a 2-GB disk image that uses 2 MB blocks requires 1024 BAT entries, where each entry is four bytes long. In some implementations, unused table entries are initialized to a physical address 0xFFFFFFFF in a memory of server 104 or other storage devices. In some implementations, BAT 208 is extended to a sector boundary and has a field (not shown) within dynamic disk header 206 indicates how many entries are valid. Each entry in BAT 208 refers to one or more data blocks in data blocks 210 in the virtual hard disk image. In some implementations, one or more data blocks in data blocks 210 may be contiguously stored with pointers to such contiguous memory locations stored in BAT 208. Since details of the format of file 200 are known to one of ordinary skill in the art, they will not be described in detail.

In conventional systems, for changes to virtual hard disks include changes to one or more data blocks in data blocks 210. Every time a data block in data blocks 210 is changed or modified, an additional VHD (or a "differencing disk") having the updated data block is created. Time taken for consolidating or merging the changes to data blocks 210 is determined as a total of time taken to download one or more data blocks 210 in different VHDs, time taken to modify one or more data blocks 210 based upon the changes, and time taken to upload one or more data blocks 210 after the changes have been performed and merging of redundant data blocks is completed. However, such downloading and uploading from a local space, e.g., on client devices 110 or server device 104, to cloud vendors C1-Cn is expensive and time consuming in direct proportion with the number of one or more data blocks 210 and respective size of one or more data blocks 210. Generally, the term downloading, in some implementations, refers to data received from cloud vendors C1-Cn at server device 104 and/or client devices 110 either as a response to a request from server device 104 and/or client devices 110, or otherwise. Likewise, the term uploading, in some implementations, refers to sending data (e.g., merged CAT tables) from server device 104 and/or client devices 110 to one or more of cloud vendors C1-Cn, e.g., after merging the CAT tables.

Instead, in some implementations, every block in data blocks 210 of the VHD is stored in a separate cloud unit storage object (e.g., an S3® object), for example in a distributed fashion. As noted above, each cloud object is a file that now stores data in data blocks 210. The distributed data blocks are then addressed to using one or more cloud allocation tables 102 (or, CAT tables 102) instead of BAT 208. As discussed below, operations are then performed on CAT tables 102, which are substantially smaller than data blocks 210 themselves, which eliminate the need for expensive downloading and overwriting of blocks in data blocks 210, as discussed below in FIG. 3.

Figure 3:
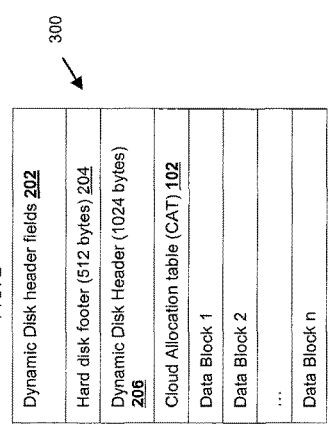
FIG. 3 is an illustration of a dynamic VHD used in a modified format of a dynamic virtual hard disk, according to various implementations of the invention.

FIG. 3 is an illustration of a format of file 200 modified to include one or more cloud allocation tables 102 to form an electronic file 300 to represent a dynamic virtual hard disk. In some implementations, a CAT table may be a data structure, stored in a storage device or memory that includes one or more identifiers or pointers to data blocks stored as distributed cloud objects. Such representation of a dynamic VHD that includes CAT tables 102 may be stored at server 104, for example, or at any other storage device such as those provided by cloud vendors C1-Cn. In some implementations, electronic file 300 includes dynamic disk header fields 202, copy of hard disk footer 204, dynamic hard disk header 206, and one or more data blocks 210 each stored in a unique cloud object. However, in some implementations, conventional BAT 202 of file 200 is replaced by one or more cloud allocation tables 102 in file 300, referred to hereinafter in singular form as cloud allocation table 102). In some implementations, cloud allocation table (CAT) 102 itself is stored as one or more cloud objects depending upon a size of CAT table 102.

Figure 4:
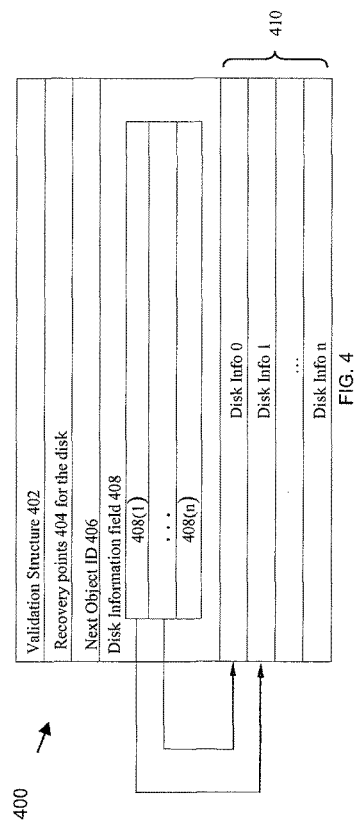
FIG. 4 is an illustration of a format for a header field for a recovery point, according to various implementations of the invention.

FIG. 4 is an illustration of a format of a header 400 for a recovery points, according to various implementations of the invention. In some implementations, header 400 includes a validation data structure 402, one or more recovery points 404, a next object identifier field 406, a disk information field 408 having one or more pointers to one or more disk information identifiers 410. In one implementation, for every recovery point on cloud vendors C1-Cn, there exists a corresponding file 300 and therefore, a unique header 400.

In some implementations, validation structure 402 includes data structures for calculating a checksum of header 400, a modification time field, and other reserved fields. In some implementations, one or more recovery points 404 each include at least one VHD image. The number of recovery points is calculated as a sum of a number 'n' of child disks of the VHD and the base disk (i.e., a total of n+1 recovery points). In some implementations, next object identifier field 406 is used in a scenario when header 400 spans across multiple objects, in which scenario next object identifier field 406 points to next object identifier in CAT 102. In some implementations, disk information field 408 includes pointers 408(1)-408(n) that point to corresponding to disk information fields 410, as indicated by arrows in FIG. 4. Disk information field 408 is described in more detail in FIG. 5. In some implementations, disk information identifiers include information related to most recent child disks in reverse chronological order, although other arrangements may be possible.

FIG. 5 illustrates disk information field 408 in more detail. In some implementations, disk information field 408 includes a header footer object identifier 502, an object identifiers number field 504, and object identifiers 504(1)-504(n). Header footer object identifier 502 includes an object identifier corresponding to a VHD's header and footer. Object identifiers 504(1)-504(n) facilitate storage of CAT table 102. VHD on host file system is stored as one file. However, VHD at cloud vendors C1-Cn is stored in multiple cloud objects that are units of data in cloud storage environment. For example, object can be an Amazon Object® provided by Amazon.com, Inc. of Seattle, Wash., or a blob in Azure® provided by Microsoft Corporation of Redmond, Wash. For each VHD in the parent chain VHD Headers (Header and Footer) are stored in one cloud object. Each data block in VHD is saved as a cloud object and the cloud object identifiers 504(1)-504(n) is stored in CAT 102 at a corresponding entry.

FIG. 6 is an illustration of an exemplary structure of cloud allocation table 102. In some implementations, a structure of CAT 102 contains as many entries as there are entries in conventional VHD BAT 208 shown in FIG. 2. The structure shown in FIG. 6 indicates a one to one mapping between cloud object identifiers 610 and one or more data blocks 210. For example, a first data block ("Data Block #1") in one or more data blocks 210 corresponds to a first cloud object identifier ("VMname_UUID_DISKID_1") among cloud object identifiers 610. If there is no entry in BAT 208 in file 200 for a given block number among one or more data blocks 210 in file 200 of FIG. 2, then a corresponding cloud object identifier in cloud object identifiers 610 is not created, as indicated, for example, by a "NULL" indicator for "Data Block #3" in FIG. 6. In some implementations, cloud object identifiers 610 each have corresponding Boolean indicators 612 that show whether or not a corresponding data block in data blocks 210 was changed in a particular recovery point or snapshot of the VM image. In some implementations, a sector map 614 indicates sectors of VHD corresponding to each of cloud identifier objects 610 where such changes occurred. In some implementations, sector map 614 may be optional and not mandatory. When data of all sectors in a specific block in data blocks 210 is present, sector map 614 may be indicated by all binary 1's when a VHD is restored.

Figure 7:
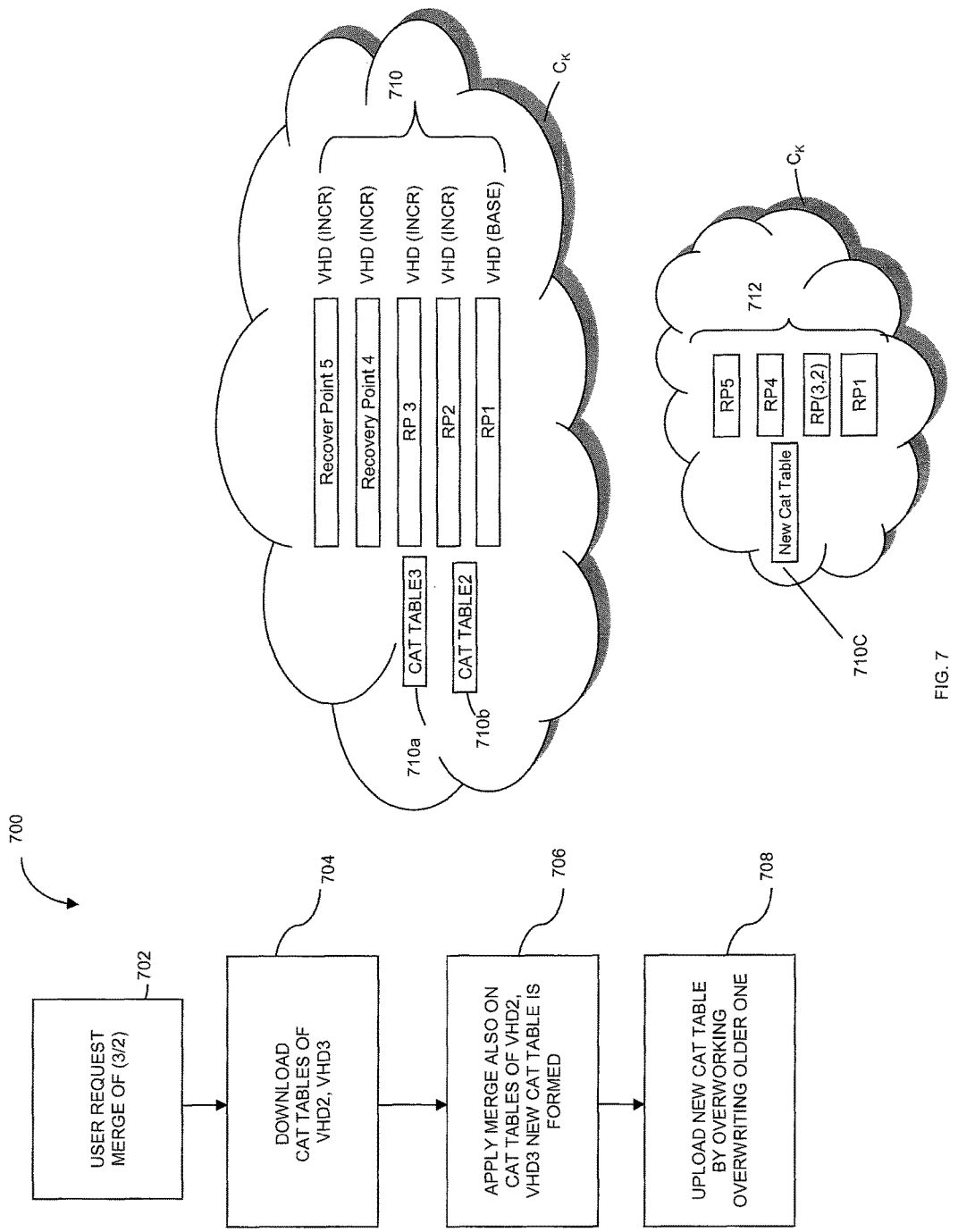
FIG. 7 illustrates a flowchart of a process for merging cloud allocation tables, according to various implementations of the invention.
Figure 8:
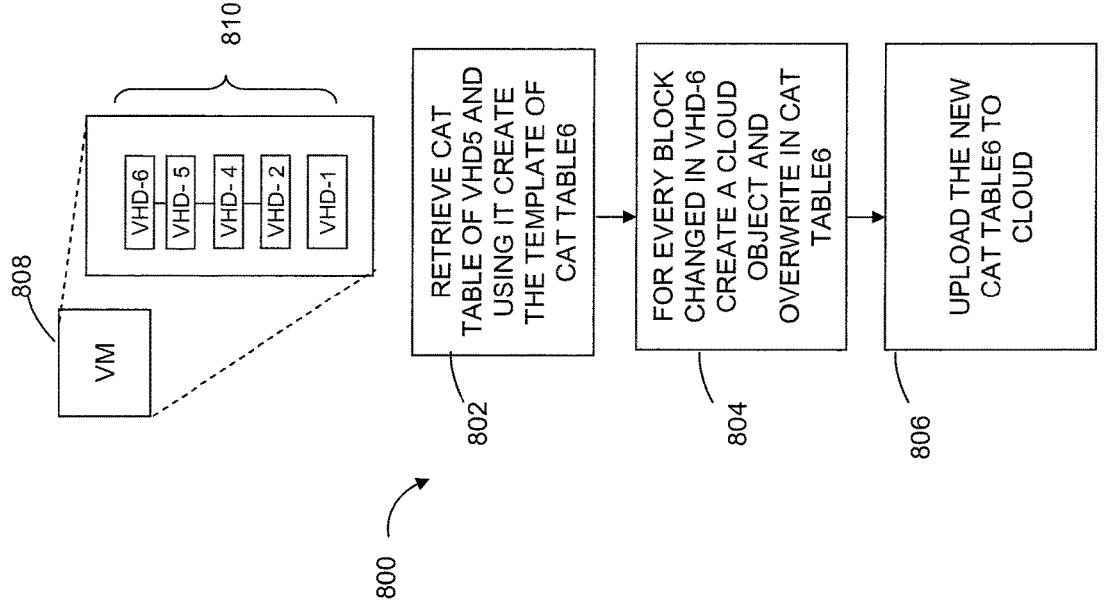
FIG. 8 illustrates a flowchart of a process for creating a cloud allocation table at a new or latest recovery point or snapshot, according to various implementations of the invention.
Figure 9:
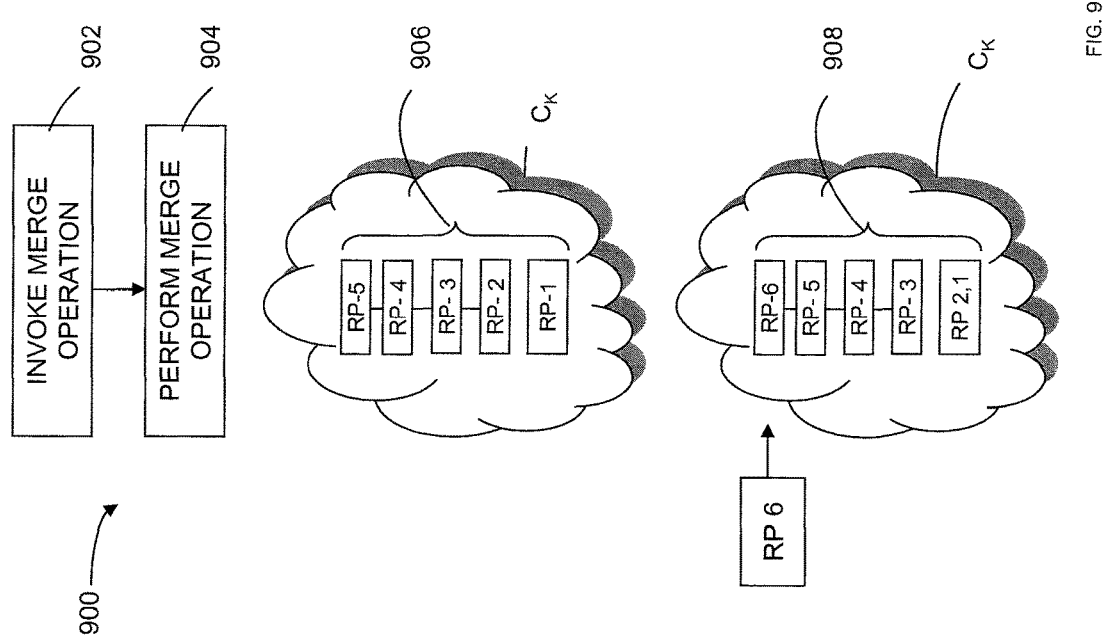
FIG. 9 illustrates an exemplary scenario of when a merge happens, according to various implementations of the invention.

FIGS. 7-9 are flowcharts of methods 700-900, respectively, depicting operations performed by one or more components of environment 100. The described operations of processes 700-900 may be accomplished using one or more of modules/sub-modules described herein and in some implementations, various operations may be performed in different sequences. In some implementations, additional operations may be performed along with some or all of the operations shown in FIGS. 7-9. In some implementations, one or more operations may be performed simultaneously. In some implementations, one or more of operations may not be performed. Accordingly, the operations described are exemplary in nature and, as such, should not be viewed as limiting. In some implementations, processes 700-900 are performed using instructions stored on tangible computer readable media (e.g., memory devices in server 104), which instructions when executed by one or more processors in server 104, or elsewhere, cause the processor to carry out the operations of processes 700-900.

FIG. 7 illustrates a process 700 for merging recovery points (RPs). In an operation 702, a user requests that a merge of RPs 3 and 2 among RPs 710 of a cloud vendor Ck (where k is an integer) be performed. RPs are point in time snapshots of images provided by cloud vendors C1-Cn and store one or more VHDs. In an operation 704, VHD management system 106 downloads CAT tables 710a and 710b corresponding to VHDs of RPs 3 and 2, respectively. It is to be noted that in RPs 710, although logical representations of RPs/VHDs show one VHD per recovery point in RPs 710, such representation is by way of example only and not by way of a limitation. For example, one or more of RPs 710 can each include two or more VHDs. Further, RP1 is denoted as an RP corresponding to a base VHD and RPs 2-5 are subsequently created RPs of incremental child VHDs storing point in time snapshots of images used by a customer (e.g., one or more client devices 110), although such representation is solely illustrative and is not meant to be limiting. In an operation, 706, merging of CAT tables of RPs 3 and 2 is carried out, and a new set of RPs 712 have a new CAT table 712a is formed for merged RPs 3,2, as shown in RPs 712, as discussed below in FIGS. 10A-10C by way of example only.

FIG. 8 illustrates a process 800 for a scenario where five RPs are stored in cloud vendors C1-Cn and a sixth RP is to be created, although such numbers of RPs are presented by way of example only and not by way of limitation. RPs in FIG. 8 are represented logically by VHDs 810. For example, VHDs 810 may be part of RPs 710. In an operation 802, to create a new CAT table, CAT table of a VHD-5 in VHDs 810 of a virtual machine 808 is retrieved and corresponding Boolean indicators 612 are marked to logical "FALSE" or binary "0" value. A template corresponding to new CAT Table 6 is created using the template of CAT table of VHD-5, as discussed below with respect to FIGS. 10A-10C. In an operation, 804, for every block changed in VHD-6, a cloud object is created in the new CAT table 6's template. Accordingly, CAT Table 6 for VHD-6 in VHDs 810 is overwritten by VHD management system 106. It is to be noted that since CAT table 6 has same template of CAT table 5, other values in the template of CAT table 6 remain unchanged. In an operation 806, VHD management system 106 uploads the new CAT table 6 of VHD-6 to cloud vendors C1-Cn. As a result, only CAT table 6, and not the actual data blocks 210 are downloaded, merged and uploaded.

FIG. 9 illustrates a process 900 for determining when a merging of RPs corresponding to base/parent VHD and child VHD may happen. In an operation 902, if a user at client devices 110 explicitly selects two RPs among RPs 906 for merging, then merging is carried out based on such a merge trigger obtained from the user. In another operation 904, a user at client devices 110 configures a maximum number of RPs (e.g., 5). Once this limit of RPs is reached, then for every new RP that is to be uploaded to cloud vendors C1-Cn, a merge operation is carried out. For example, a new RP6 in RPs 908 causes RPs 1 and 2 in RPs 906 to merge, as shown by RP 2,1 in RPs 908. As a result of merging only RPs and therefore, corresponding CAT tables in those RPs, significant cost savings are achieved when compared with conventional merging of actual data of snapshots in data blocks 210.

FIGS. 10A-10C illustrate an example implementation where cloud allocation tables of a base disk (or, parent disk) and a child disk are merged to result in an updated cloud allocation table with changes from both the base and the child disks incorporated therein. FIG. 10A illustrates CAT table of a base VHD with cloud object identifiers (similar to cloud object identifiers 610) and Boolean indicators (similar to Boolean indicators 612) for corresponding cloud object identifiers (similar to object identifiers 610). By way of example only and not by way of limitation, assuming base VHD contains Block #1, Block #2, and Block #3 (similar to data blocks 210) and assuming only sector#42 is valid in Block #1, Block #1, Block #2, Block #3 are replicated to ObjectID #1, ObjectID #2, ObjectID #3 (similar to cloud object identifiers 610) in cloud vendors C1-Cn. For base VHD, CAT 102 with metadata to store cloud object identifiers 610 for each valid block for that disk is created at VHD management system 106 of server 104, or other storage devices such as those in cloud vendors C1-Cn. CAT 102 contains ObjectID #1, ObjectID #2, ObjectID #3 and corresponding Boolean indicators 612 for the base VHD disk, a parameter ("IsChangedinThisrecoveryPoint"), that indicates changes in this base VHD, is set to a "true" (or, "T") value for all valid entries of CAT 102.

FIG. 10B illustrates CAT 102 of a child VHD. Assuming in the child VHD only sector#1 is modified in Block #1. When the child disk is generated in one of cloud vendors C1-Cn, each block in the child disk is a consolidation of all its parent changes and its own changes. Therefore, Block #1 should contain both sector#1 and sector #42. For the generation of CAT 102 of a child disk, CAT 102 of the parent VHD is taken and all Boolean indicators 612 are marked as "False" (or, "IsChangedinThisrecoveryPoint" variables are changed to "F"). A cloud object is newly created with data of Block #1 and cloud object identifiers 610 that are newly created are overwritten and the corresponding Boolean indicators are changed to "True" (or, "IsChangedinThisrecoveryPoint" is set to "T"). Therefore, for each valid block in child disk CAT 102, corresponding cloud object identifiers 610 are obtained and overwritten at the corresponding blocks. For example, ObjectID #1 is overwritten with ObjectId#4, and sector map 614 is updated to contain both sector #1 and Sector #42 with corresponding Boolean indicator in Boolean indicators 612 changed to a value "true" (or, "IsChangedinThisrecoveryPoint" changed to "T") resulting in CAT 102 child disk containing ObjectID #4, ObjectID #2, and ObjectID #3 as shown in FIG. 10B.

FIG. 10C illustrates resulting CAT 102 after a merging operation performed according implementations of method 700-900. In FIG. 10C, only metadata in the form of CAT 102 is merged but not the actual data. Further, delete operations generally may not involve any cost and are therefore can be freely performed by VHD management system 106. After, downloading only CAT (e.g., CAT 102) from cloud vendors C1-Cn, a modification of the CAT table of the child disk that is latest among the two disks (i.e., parent VHD and child VHD) that are being merged is performed by VHD management system 106. An iteration over both the CAT tables of base/parent VHD and child VHD is carried out by VHD management system 106, and all the cloud objects of parent disk whose cloud object identifiers 610 are overwritten with child VHD's cloud object identifiers are deleted. That is, at each iteration if "IsChangedinThisrecoveryPoint" is "T" for both child and parent VHDs, then the object belonging to parent VHD's data blocks 210 are deleted. For the example above in FIGS. 10A and 108, "IsChangedinThisrecoveryPoint" is "T" for only data block #1 in both child disk and base disk. So, object corresponding to data block #1, which is ObjectID #1, is deleted.

All "IsChangedinThisrecoveryPoint" parameters are then marked to "T" when merging of child disk to base disk is to be carried out by VHD management system 106. When merging two child disks "IsChangeinThisrecoveryPoint" is changed to a value "T" only when either of the child disk has "T". Subsequently, uploading the CAT table of the child disk that is modified to cloud vendors C1-Cn is carried out by overwriting the older CAT table. Finally, the CAT table and headers of the parent disk are deleted and accordingly a "CloudVHDHeader" (e.g., header 400) is updated by removing the corresponding entry in disk information fields 408 for the particular disk. Accordingly, the number of recovery points (RPs) for the disk are decremented. For every VHD recovered from cloud storage environment 100 (e.g., from cloud vendors C1-Cn), the CAT table of the corresponding child disk for a particular RP or snapshot is taken and VHD is created locally from the CAT table by reading object identifiers (e.g., cloud object identifiers 610)

Cloud computing and virtualization are emerging markets in the coming decades. Cloud computing and virtualization are changing the basic paradigm of information technology infrastructure. Various implementations of the invention disclosed above advantageously optimize the way VHDs (virtual hard disks) are stored and managed at cloud. In some implementations, such optimization can be part of Hyper-V® virtual machine manager provided by Microsoft Corporation of Redmond, Wash. Various implementations of the invention save cost and time to recover a VHD from a given snapshot. Further, merging two VHD disks in cloud environments (e.g., environment 100) is fast and incurs very less cost. By way of example only and not by way of limitation, in a scenario where snapshots are changed and have to be updated and/or merged, at time taken for merging=time taken to download meta data files+time taken to manipulate meta data files+time taken to upload meta data files. Since metadata files (e.g., file 300 having CAT 102) are substantially smaller than the actual data files, by performing operations (e.g., those disclosed in processes 700-900) on such files, fast merging of recovery points and snapshot data occurs. Processes 700-900 may be applied to any virtual disks that adhere to VHD specification, although the implementations may be modified for other forms of virtual hard disks.

Instead of or in addition to cloud storage, various implementations of this invention can be used, for example, for Hadoop Distributed File System (HDFS) where a file is used instead of a cloud object. In HDFS, an object identifier may be a file name. Various implementations of this invention can also be used for file systems where files are used as cloud objects, such that object identifiers are filenames. In some implementations, the disclosure may be extended to store multiple objects in same file where object identifier will include both filename and offset.

Implementations of the invention may be made in hardware, firmware, middleware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention, and performing certain actions. However, it will be apparent that such descriptions are merely for convenience, and that such actions may in fact result from computing devices, processors, controllers, or other devices executing firmware, software, routines or instructions.

Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method, comprising:
    modifying a first virtual hard disk file, having a block allocation table, to form a second virtual hard disk having a cloud allocation table, wherein:
        the first virtual hard disk file comprises a disk header, a disk footer, and a plurality of data blocks storing the contents of the first virtual hard disk,
        the block allocation table comprises a table of absolute sector offsets into the file, the respective offsets corresponding to respective ones of the data blocks,
        the cloud allocation table comprises pointers to the data in the data blocks stored as distributed cloud objects, at least some of the distributed cloud objects being distributed in different files or blobs from one another;
    creating a plurality of recovery points by, for each of at least some of the plurality of recovery points:
        accessing a previous recovery point; and
        for cloud objects storing data that has changed since the previous recovery point, causing the changed data to be stored in a new cloud object identified in a cloud allocation table of a current recovery point;
    merging, with one or more computing devices, at least some of the recovery points without downloading to the one or more computing devices at least some of the cloud objects pointed to in respective cloud allocation tables of the merged recovery points; and
    storing the merged recovery points.

2. The method of claim 1, comprising:
    before merging at least some of the recovery points, determining that a threshold number of recover points have been created, wherein:
        merging is performed in response to the determination, and
        merging comprises merging two consecutive recovery points in a sequence of recover points.

3. The method of claim 1, wherein:
    the first virtual hard disk is a dynamic virtual hard disk configured to be dynamic increased in size by adding data blocks, the dynamic virtual hard disk comprising a sector map including a bitmap that indicates which sectors contain valid data and which sectors have not been modified.

4. The method of claim 1, wherein creating the plurality of recovery points comprises:
    obtaining a parent virtual hard disk corresponding to one recovery point among the plurality of recovery points, the parent virtual hard disk comprising a parent cloud allocation table comprising a pointer to a given cloud object;
    determining that, in a snapshot of the first virtual hard disk for a subsequent recovery point to the one recover point, data has changed relative to a version of the data in the given cloud object; and
    forming a child virtual hard disk corresponding to the subsequent recovery point, the child virtual hard disk comprising a child cloud allocation table that:
        omits the pointer to the given cloud object; and
        includes a pointer to a new cloud object absent from the parent cloud allocation table in a position corresponding to that of the omitted pointer.

5. The method claim 4, wherein merging the at least some of the recovery points comprises:
    forming a merged virtual hard disk having a merged cloud allocation table comprising both the pointer to the new cloud object and another pointer to another cloud object present in the parent cloud allocation table.

6. The method claim 1, wherein:
    the pointers in the cloud allocation table point via cloud object identifiers; and
    there is a one to one mapping between cloud object identifiers and at least a plurality of the plurality of the data blocks.

7. The method of claim 1, wherein the cloud objects are data blobs.

8. The method of claim 1, wherein the cloud objects are files.

9. The method of claim 1, wherein:
    a given plurality of the cloud objects are stored in a single file; and
    the pointers pointing to the given plurality of the cloud objects include both a filename and an offset.

10. The method of claim 1, comprising:
    restoring the first virtual hard disk to a snapshot of the first virtual hard disk with at least some of the plurality of recovery points.

11. The method of claim 10, wherein:
    at least a plurality of the data blocks of the restored first virtual hard disk are contiguously stored in contiguous memory locations;

the restored first virtual hard disk comprises a restored block allocation table having pointers to the contiguous memory locations;

there is a one to one mapping between cloud object identifiers serving as pointers in cloud allocation tables of the at least some of the plurality of the recovery points and the data blocks of the restored first virtual hard disk; and merging comprises merging without downloading to the one or more computing devices any of the cloud objects identified in respective cloud allocation tables of the merged recovery points.

12. The method of claim 1, wherein creating a plurality of recovery points comprises:

obtaining a plurality snapshots of the first virtual hard disk over time;

for each of the snapshots forming a recovery point with operations comprising:

creating a template cloud allocation table that copies a previous cloud allocation table;

determining which data blocks of the first virtual hard disk have changed since a previous snapshot or, for a first snapshot, since a base version of the first virtual hard disk;

modifying the template cloud allocation table to omit pointers to cloud objects storing the data blocks determined to have changed and add pointers to cloud objects storing current versions of the data blocks that have changed;

indicating which entries in the modified template cloud allocation table are presently modified; and causing the modified template cloud allocation table to be stored.

13. The method of claim 12, wherein forming a recovery point comprises:

forming a sector map indicating sectors of the first virtual hard disk determined to have changed, each entry in the sector map being associated with one of the pointers to the cloud objects in the modified template cloud allocation table.

14. The method of claim 1, wherein forming a recovery point comprises:

forming a recovery-point header comprising:

a validation data structure to determine a checksum of the recovery-point header;

identifiers of a plurality of other recovery points, each corresponding to a different virtual hard disk image; and disk information identifiers that include information related to most recent child disks in reverse chronological order.

15. The method of claim 1, wherein merging comprises: steps for merging recovery points.

16. The method of claim 1, the operations comprising: steps for managing virtual hard disks.

17. The method of claim 1, comprising:

providing a cloud computing or storage environment in which the cloud objects are stored; and storing the cloud objects.

18. A tangible, non-transitory, machine-readable medium storing instructions that when executed by one or more processors effectuate operations comprising:

modifying a first virtual hard disk file, having a block allocation table, to form a second virtual hard disk having a cloud allocation table, wherein:

the first virtual hard disk file comprises a disk header, a disk footer, and a plurality of data blocks storing the contents of the first virtual hard disk, the block allocation table comprises a table of absolute sector offsets into the file, the respective offsets corresponding to respective ones of the data blocks, the cloud allocation table comprises pointers to the data in the data blocks stored as distributed cloud objects, at least some of the distributed cloud objects being distributed in different files or blobs from one another;

creating a plurality of recovery points by, for each of at least some of the plurality of recovery points:

accessing a previous recovery point; and for cloud objects storing data that has changed since the previous recovery point, causing the changed data to be stored in a new cloud object identified in a cloud allocation table of a current recovery point;

merging, with one or more computing devices, at least some of the recovery points without downloading to the one or more computing devices at least some of the cloud objects pointed to in respective cloud allocation tables of the merged recovery points; and storing the merged recovery points.

19. The medium of claim 18, the operations comprising:

restoring the first virtual hard disk to a snapshot of the first virtual hard disk with at least some of the plurality of recovery points, wherein:

at least a plurality of the data blocks of the restored first virtual hard disk are contiguously stored in contiguous memory locations, the restored first virtual hard disk comprises a restored block allocation table having pointers to the contiguous memory locations, and there is a one to one mapping between cloud object identifiers serving as pointers in cloud allocation tables of the at least some of the plurality of the recovery points and the data blocks of the restored first virtual hard disk.

20. The medium of claim 18, wherein creating a plurality of recovery points comprises:

obtaining a plurality snapshots of the first virtual hard disk over time; and for each of the snapshots forming a recovery point with operations comprising:

creating a template cloud allocation table that copies a previous cloud allocation table; and determining which data blocks of the first virtual hard disk have changed since a previous snapshot or, for a first snapshot, since a base version of the first virtual hard disk.

\* \* \* \* \*